US009794575B2

(12) United States Patent
Pearson

(10) Patent No.: US 9,794,575 B2
(45) Date of Patent: Oct. 17, 2017

(54) APPARATUSES AND METHODS FOR OPTIMIZING RATE-DISTORTION COSTS IN VIDEO ENCODING

(71) Applicant: Magnum Semiconductor, Inc., Milpitas, CA (US)

(72) Inventor: Eric C. Pearson, Conestogo (CA)

(73) Assignee: Magnum Semiconductor, Inc., San Jose, CA (US)

( * ) Notice: Subject to any disclaimer, the term of this patent is extended or adjusted under 35 U.S.C. 154(b) by 551 days.

(21) Appl. No.: 14/133,261

(22) Filed: Dec. 18, 2013

(65) Prior Publication Data

US 2015/0172662 A1    Jun. 18, 2015

(51) Int. Cl.

| H04N 7/12 | (2006.01) |
|---|---|
| H04N 11/02 | (2006.01) |
| H04N 11/04 | (2006.01) |
| H04N 19/147 | (2014.01) |
| H04N 19/124 | (2014.01) |
| H04N 19/19 | (2014.01) |
| H04N 19/176 | (2014.01) |
| H04N 19/91 | (2014.01) |

(52) U.S. Cl.
CPC ......... *H04N 19/147* (2014.11); *H04N 19/124* (2014.11); *H04N 19/176* (2014.11); *H04N 19/19* (2014.11); *H04N 19/91* (2014.11)

(58) Field of Classification Search
None
See application file for complete search history.

(56) References Cited

U.S. PATENT DOCUMENTS

| 5,844,945 A | 12/1998 | Nam et al. |
|---|---|---|
| 6,043,844 A | 3/2000 | Bist et al. |
| 6,771,831 B2 | 8/2004 | Effros et al. |
| 7,061,410 B1 | 6/2006 | Pearson et al. |

(Continued)

FOREIGN PATENT DOCUMENTS

| EP | 1753242 A2 | 2/2007 |
|---|---|---|
| EP | 1 906 676 A1 | 2/2008 |

(Continued)

OTHER PUBLICATIONS

"H.263: Video coding for low bit rate communication", www.itu.int.rec/T-REC-H.263/e, updated Mar. 6, 2007 (printed Jan. 8, 2013).

(Continued)

*Primary Examiner* — Talha M Nawaz

(57) ABSTRACT

Apparatuses and methods for optimizing rate-distortion costs of a signal are disclosed. An apparatus may include an encoder. The encoder may be configured to receive a video signal and provide a residual indicative of a difference between the video signal and a reconstructed video signal. The encoder may further be configured to perform a transform on the residual to provide a plurality of transform coefficients and rate-distortion optimize the plurality of transform coefficients in accordance with an HEVC state transition scheme to provide a rate-distortion optimized plurality of quantized coefficients. The encoder may further be configured to encode the plurality of quantized coefficients in accordance with context-adaptive binary arithmetic coding.

11 Claims, 11 Drawing Sheets

(56) References Cited

U.S. PATENT DOCUMENTS

| | | |
|---|---|---|
| 7,072,387 B1 | 7/2006 | Betts |
| 7,593,583 B2 | 9/2009 | Inada |
| 7,596,179 B2 | 9/2009 | Shen et al. |
| 7,936,818 B2 * | 5/2011 | Jayant .................. H04N 19/00 375/240.05 |
| 7,957,600 B2 | 6/2011 | Yang |
| 7,995,649 B2 | 8/2011 | Zuo et al. |
| 8,031,777 B2 | 10/2011 | Haskell et al. |
| 8,130,828 B2 | 3/2012 | Hsu et al. |
| 8,175,167 B2 | 5/2012 | Bouton et al. |
| 8,208,548 B2 | 6/2012 | Nagaraj et al. |
| 9,185,419 B2 | 11/2015 | Le Leannec et al. |
| 9,392,286 B2 | 7/2016 | Pearson |
| 9,491,475 B2 | 11/2016 | Pearson |
| 2006/0013497 A1 | 1/2006 | Yang et al. |
| 2006/0220927 A1 | 10/2006 | Park |
| 2006/0227868 A1 | 10/2006 | Chen et al. |
| 2006/0245502 A1 | 11/2006 | Cheng et al. |
| 2007/0189392 A1 | 8/2007 | Tourapis et al. |
| 2007/0285285 A1 | 12/2007 | Puri et al. |
| 2008/0130745 A1 | 6/2008 | Pandit et al. |
| 2008/0192821 A1 * | 8/2008 | Malayath ............. H04N 19/154 375/240.03 |
| 2008/0247462 A1 | 10/2008 | Demos |
| 2009/0141814 A1 | 6/2009 | Yin et al. |
| 2009/0168868 A1 | 7/2009 | Jahanghir |
| 2009/0196517 A1 | 8/2009 | Divorra Escoda et al. |
| 2009/0238271 A1 | 9/2009 | Kim et al. |
| 2009/0257489 A1 | 10/2009 | Karczewicz et al. |
| 2010/0008417 A1 | 1/2010 | Xu et al. |
| 2010/0046614 A1 | 2/2010 | Choi et al. |
| 2010/0177819 A1 | 7/2010 | Jeon et al. |
| 2010/0220937 A1 | 9/2010 | Furbeck |
| 2010/0238997 A1 | 9/2010 | Yang et al. |
| 2010/0266047 A1 | 10/2010 | Takahashi et al. |
| 2010/0316118 A1 | 12/2010 | Li et al. |
| 2011/0164677 A1 | 7/2011 | Lu et al. |
| 2012/0008680 A1 * | 1/2012 | He ........................ H04N 19/147 375/240.12 |
| 2012/0014435 A1 | 1/2012 | Yang et al. |
| 2012/0020549 A1 | 1/2012 | Lee et al. |
| 2012/0076203 A1 | 3/2012 | Sugimoto et al. |
| 2012/0140822 A1 | 6/2012 | Wang et al. |
| 2012/0177109 A1 * | 7/2012 | Ye ........................ H04N 19/197 375/240.03 |
| 2012/0219055 A1 * | 8/2012 | He ........................ H04N 19/176 375/240.03 |
| 2012/0219057 A1 | 8/2012 | Takahashi et al. |
| 2013/0003824 A1 * | 1/2013 | Guo ..................... H04N 19/176 375/240.03 |
| 2013/0064290 A1 | 3/2013 | Kung et al. |
| 2013/0083845 A1 * | 4/2013 | Yu ........................ H04N 19/197 375/240.03 |
| 2013/0114717 A1 | 5/2013 | Zheng et al. |
| 2013/0188686 A1 | 7/2013 | Tourapis |
| 2013/0208901 A1 | 8/2013 | Chen et al. |
| 2013/0235938 A1 * | 9/2013 | Huang ................. H04N 19/176 375/240.18 |
| 2013/0259119 A1 | 10/2013 | Pearson |
| 2013/0279583 A1 | 10/2013 | Gao et al. |
| 2013/0329784 A1 | 12/2013 | Chuang et al. |
| 2014/0010292 A1 * | 1/2014 | Rapaka ................. H04N 19/176 375/240.12 |
| 2014/0269902 A1 | 9/2014 | Pearson |
| 2015/0172660 A1 | 6/2015 | Wang et al. |

FOREIGN PATENT DOCUMENTS

| | | |
|---|---|---|
| JP | H11275578 A | 10/1999 |
| JP | 2012104926 A | 5/2012 |
| WO | 2007081908 A1 | 7/2007 |
| WO | 2009049248 A2 | 4/2009 |
| WO | 2009126919 A1 | 10/2009 |
| WO | 2009155398 A1 | 12/2009 |
| WO | 2012142731 A1 | 10/2012 |
| WO | 2014149818 A1 | 9/2014 |
| WO | 2015094557 A1 | 6/2015 |
| WO | 2015094560 A1 | 6/2015 |

OTHER PUBLICATIONS

"H.264: Advanced video coding for generic audiovisual services", www.itu.int/rec/T-REC-H.264/e, updated Aug. 9, 2012 (printed Jan. 8, 2013).

International Telecommunication, "Video coding for low bit rate communication", www.itu.int, Jan. 2005, 1-226.

Merritt, Loren , "Notes on the Implementation of Trellis Quantization in H.264", http://akuvian.org/src/x264/trellis.txt, Nov. 3, 2011.

Yang, En-Hui et al., "Rate Distortion Optimization in H.264", Department of Electrical and Computer Engineering, University of Waterloo, Waterloo, Ontario N2L 6E3, Canada, paper associated with a workshop presentation held Feb. 2006.

"Text of ISO/IEC 14496-10:200X / FDIS Advanced Video Coding (4th Edition)", 81. MPEG Meeting; Feb. 6, 2007-Jun. 6, 2007; Lausanne, (Motion Picture Expert Group or ISO/IEC JTC1/SC29/WG11); No. N9198, Oct. 28, 2007 (Oct. 28, 2007); EP030015692, ISSN: 0000-0130.

Tourapis, Alexis M. et al., "Reduced Resolution UPDTE Mode for Enhanced Compression", Joint Collaborative Team on Video Coding (JCT-VC) of ITU-T SG16 WP3 and ISO/IEC JTC1/SC29/WG11; 8th Meeting: San Jose, CA, USA, Feb. 1-10, 2012.

Wedi, Thomas et al., "Intra only 4:4:4 coding for H.264/AVC FRExt", Joint Video Team (JVT) of ISO/IEC MPEG & ITU-T VCEG, 16th Meeting: Poznan, PLC, Jul. 24-29, 2005.

Luttrell, et al., "Trellis-based R-D optimal quantization in H.263+", 2000 International Conference on Sep. 10-13, 2000, IEEE, Piscataway, NJ, USA, Sep. 10, 2000 (Sep. 10, 2000)pp. 852-854, vol. 2, XP031534587, ISBN: 978-0-7803-6297-0, Sep. 10, 2000, 852-854.

Reisman, et al., "Multiple description video using rate-distortion splitting", Proceedings 2001 International Conference on Image Processing. ICIP 2001—Thessaloniki, Greece, Oct. 7-10, 2001; [International Conference on Image Processing], Institute of Electrical and Electronics Engineers, New York, NY, vol. 1, 7 Oct. 2001 {200, 978-981.

Wanga, et al., "Rate distortion optimized quantization for H.264/AVC based on dynamic programming", Visual Communications and Image Processing; Jul. 12, 2005-Jul. 15, 2005; Beijing, Jul. 12, 2005 (Jul. 12, 2005), XP030081056, pp. 2102-2103., Jul. 12, 2005, 2100-2111.

Zhang, et al., "Variable-Bin-Rate CABAC Engine for H.264/AVC High Definition Real-Time Decoding", IEEE Transactions on Very Large Scale Integration (VLSI)Systems, IEEE Service Center, Piscataway, NJ, USA, vol. 17, No. 3, Mar. 1, 2009 (Mar. 1, 2009), pp. 417-426, XP011249867, ISSN: 1063-8210, DOI: 10.1109/TVLSI.2008.2005286 * figure 8 *, Mar. 1, 2009, 417-426.

Chen, Bo-Yuan et al., "Using H.264 Coded Block Patterns for Fast Inter-mode Selection", Proc. of the IEEE Int. Conf. on Multimedia and Expo 2008, Jun. 2008, pp. 721-724, ISBN: 978-1-4244-2570-9.

Zhang, Peng et al., "Variable-Bin-Rate CABAC Engine for H.264/AVC High Definition Real-Time Decoding", IEEE Transactions on Very Large Scale Integration (VLSI) Systems, vol. 17,No. 3, Mar. 2009, pp. 417-426, ISSN: 1063-8210.

Karczewicz "A Hybrid Video Codec Based on Extended Block Sizes, Recursive Integer Transforms, Improved Interpolation, and Flexible Motion Representation", Proc. SPIE 7882, Visual Information Processing and Communication II, 788203; Jan. 31, 2011.

Karczewicz et al., "Rate Distortion Optimized Quantization", Doc VCEGAH21. ITU-T SG16/Q6 VCEG, Antalya, TR (2008) Joint Video Team (JVT) of ISO/IEC MPEG & ITU-T VCEG (ISO/IEC JTC1/SC29/WG11, and ITU-T SG16 (J.6) 27th Meeting; Geneva, CH, Apr. 24-29, 2008.

Li, et al. "Rate-Distortion Optimized Frame Level Rate Control for H.264/AVC", 16th European Signal Processing Conference (EUSIPCO 2008), Lausanne, Switzerland, Aug. 25-29, 2008, copyright by EURASIP.

(56) References Cited

OTHER PUBLICATIONS

International Search Report and Written Opinion for International Application No. PCT/US14/066442 mailed on Feb. 23, 2015.
Yu, Xiang, "Image and Video Coding/Transcoding: A Rate Distortion Approach", Thesis presented to the University of Waterloo, Ontario, Canada, A PHD, 2008, 1-156.
"Chrominance", Wikipedia, Dec. 28, 2011 (Dec. 28, 2011), XP055316970, Retrieved from the Internet: URL:https://en.wikipedia.org/w/index.php? title=Ch rominance &oldid=468106136 [retrieved on Nov. 7, 2016], pp. all.

* cited by examiner

APPARATUSES AND METHODS FOR OPTIMIZING RATE-DISTORTION COSTS IN VIDEO ENCODING

TECHNICAL FIELD

Embodiments of this invention relate generally to video encoding, and examples of quantizing transform coefficients in a manner which may optimize rate-distortion costs are described.

BACKGROUND

Video or other media signals may be used by a variety of devices, including televisions, broadcast systems, mobile devices, and both laptop and desktop computers. Typically, devices may display video in response to receipt of video or other media signals, often after decoding the signal from an encoded form. Video signals provided between devices are often encoded using one or more of a variety of encoding and/or compression techniques, and video signals are typically encoded in a manner to be decoded in accordance with a particular standard, such as HEVC, MPEG-2, MPEG-4, and H.264/MPEG-4 Part 10. By encoding video or other media signals, and later decoding the received signals, the amount of data transmitted between devices may be reduced.

Video encoding typically proceeds by encoding coding units of video data. Prediction coding may be used to generate predictive blocks and residual blocks, where the residual blocks represent a difference between a predictive block and the block being coded. Prediction coding may include spatial and/or temporal predictions to remove redundant data in video signals, thereby reducing the amount of data. Intracoding for example, is directed to spatial prediction and reducing the amount of spatial redundancy between blocks in a frame or slice. Intercoding, on the other hand, is directed toward temporal prediction and reducing the amount of temporal redundancy between blocks in successive frames or slices. Intercoding may make use of motion prediction to track movement between corresponding blocks of successive frames or slices.

Typically, in encoder implementations, including intracoding and intercoding based implementations, residuals (e.g., difference between actual and predicted blocks) may be transformed, quantized, and encoded using one of a variety of encoding techniques (e.g., entropy encoding) to generate a set of coefficients. It is these coefficients that may be transmitted between the encoding device and the decoding device. Quantization may be determinative of the amount of loss that may occur during the encoding of a video stream. That is, the amount of data that is removed from a bitstream may be dependent on a quantization parameter generated by and/or provided to an encoder.

Video encoding techniques typically perform some amount of rate-distortion optimization. Generally a trade-off exists between an achievable at a rate and the amount of distortion present in a decoded signal. Many encoders utilize quantization for rate-distortion optimization of a video signal in accordance with one or more coding standards. In doing so, however, costs, including rate costs and distortion costs, must be calculated so that coefficients of each residual may be optimized for the selected coding standard. This cost measurement requires not only transformation and quantization of coefficients, but encoding of the coefficients as well. As a result, and in particular for more complex encoding algorithms, optimizing coefficients in real-time as presented challenges. Because many coding standards require highly complex and demanding computations for encoding, rate calculation, and therefore, rate-distortion optimization, for many current coding standards, is simply too demanding for completion in real-time.

DETAILED DESCRIPTION

Examples of methods and apparatuses for optimizing rate-distortion costs in video encoding are disclosed herein. Certain details are set forth below to provide a sufficient understanding of embodiments of the invention. However, it will be clear to one having skill in the art that embodiments of the invention may be practiced without these particular details, or with additional or different details. Moreover, the particular embodiments of the present invention described herein are provided by way of example and should not be used to limit the scope of the invention to these particular embodiments. In other instances, well-known video components, encoder or decoder components, circuits, control signals, timing protocols, and software operations have not been shown in detail in order to avoid unnecessarily obscuring the invention.

Figure 1:
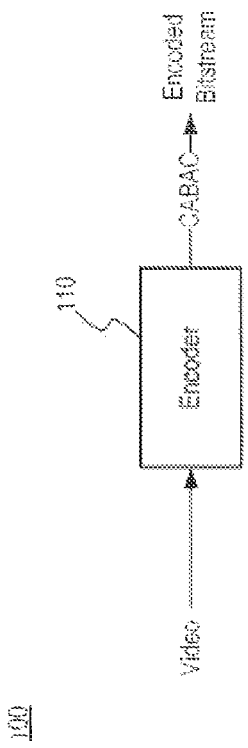
FIG. 1 is a block diagram of an apparatus according to an embodiment of the present invention.

FIG. 1 is a block diagram of an apparatus 100 according to an embodiment of the invention. The apparatus 100 may include an encoder 110 configured to receive a signal, such as a video signal including video data (e.g., frames). The apparatus 10 may be implemented in any of a variety of devices employing video encoding, including but not limited to, televisions, broadcast systems, mobile devices, and both laptop and desktop computers. Generally, the encoder 110 may operate at a fixed rate to output a bitstream that may be generated in a rate-independent manner. The encoder may encode at a variable bit rate or at a constant bit rate.

The encoder 110 may include one or more logic circuits, control logic, logic gates, processors, memory, and/or any combination or sub-combination of the same, and may encode and/or compress a video signal using one or more encoding techniques. The encoder 110 may encode in accordance with one or more encoding techniques, such as HEVC. In at least one embodiment, the encoder 110 may include an entropy encoder, such as a context-adaptive binary arithmetic coding (CABAC) encoder. Encoding in accordance with HEVC may, for instance, allow the encoder 110 to provide a CABAC bitstream in real-time without the use of a transcoder. The encoder 110 may further encode data, for instance, at a coding tree unit level. Each coding tree unit may be encoded in intra-coded mode, inter-coded mode, bidirectionally, or in any combination or subcombination of the same.

In an example operation of the apparatus 100, the encoder 110 may receive and encode a video signal to provide an encoded bitstream. The encoded bitstream may be provided to external circuitry. By way of example, the encoder 110 may provide the encoded bitstream to a decoder, which may subsequently provide (e.g., generate) a reconstructed video signal based on the encoded bitstream. The video signal provided to the encoder 110 may differ from the video signal provided by a decoder due to lossy encoding operations performed by the encoder 110, such as quantization.

In some examples, the encoder 110 may employ rate-distortion optimizing during an encoding process. Rate-distortion optimization generally refers to a process designed to select a particular rate-distortion trade-off where a sufficient rate is maintained with an allowable amount of distortion. A rate-distortion cost, or "RD score", may typically be represented by a rate factor lambda ($\lambda$) multiplied by the rate and the product added to the distortion. Generally, encoding methods may select parameters used during encoding to provide an RD score meeting a certain criteria— e.g. minimizing an RD score. As will be explained in more detail below, in at least one embodiment, the encoder 110 may employ rate-distortion optimization rate by optimizing quantized coefficients.

Figure 2:
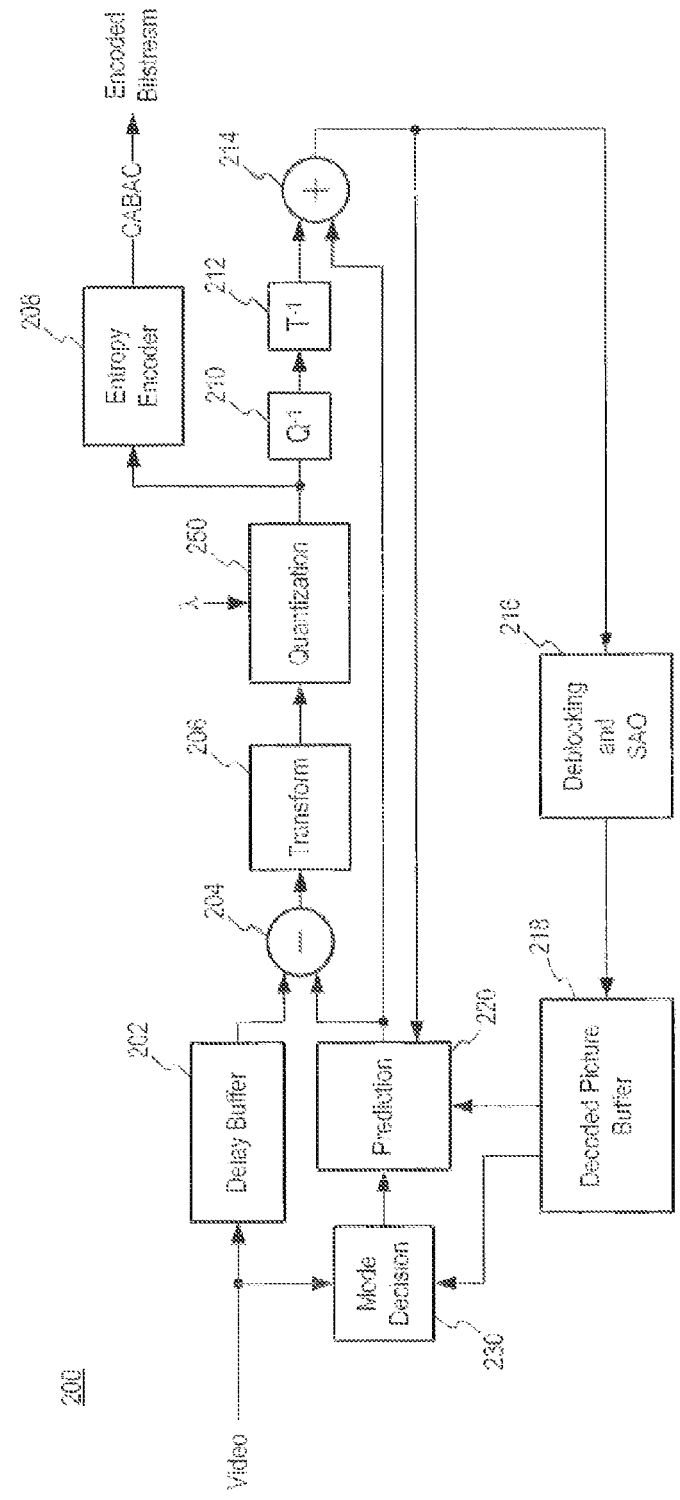
FIG. 2 is a schematic block diagram of an encoder that may be used in the apparatus of FIG. 1 according to an embodiment of the present invention.

FIG. 2 is a schematic block diagram of an encoder 200 according to an embodiment of the invention. The encoder 200 may be in part used to implement the encoder 110 of FIG. 1, and may further be compliant with the HEVC standard. In some embodiments, the encoder 200 may additionally or alternatively be compliant with one or more other coding standards in the art, known now or in the future.

The encoder 200 may include a forward encoding path including a mode decision block 230, a prediction block 220, a delay buffer 202, a transform 206, a quantization block 250, and entropy encoder 208, an inverse quantization block 210, an inverse transform block 212, a filter 216, and a encoded picture buffer 218. The mode decision block 230 may determine an appropriate coding mode based, at least in part, on the incoming video signal and decoded picture buffer signal, described further below, and/or may determine an appropriate coding mode on a per frame, coding tree unit, and/or subblock basis. Additionally, the mode decision block 230 may employ motion and/or disparity estimation of the video signal. The mode decision may include intra modes, inter modes, motion vectors, and quantization parameters. In some examples of the present invention, the mode decision block 230 may provide lambda that may be used by the optimized quantization block 250, described further below. The mode decision block 230 may also utilize lambda in making mode decisions in accordance with examples of the present invention.

The output of the mode decision block 230 may be utilized by the prediction block 220 to generate a predictor in accordance with a coding standard, such as the HEVC coding standard. The predictor may be subtracted by a delayed version of the video signal at the subtractor 204. Using the delayed version of the video signal may provide time for the mode decision block 230 to act. The output of the subtractor 204 may be a residual, e.g., the difference between a block and a predicted block, and the residual may be provided to the transform 206.

The transform 206 may perform a transform, such as a discrete cosine transform (DCT) or a discrete sine transform (DST), to transform the residual to the frequency domain. As a result, the transform 206 may provide a coefficient block corresponding to spectral components of data in the video signal. The quantization block 250 may receive the coefficient block and quantize the coefficients of the coefficient block to product a quantized coefficient block. The quantization employed by the quantization block 250 may be lossy, but may adjust and/or optimize one or more coefficients of the quantized coefficient block, for instance, based on Lagrangian cost function. By way of example, the quantization block 250 may utilize a rate factor lambda to optimize rate-distortion. Lambda may be received from the mode decision block 230 or may be specified by a user. Lambda may vary, e.g. per coding tree unit or subblock, and may be based on information encoded by the video signal. For example, video signals encoding advertising may utilize a generally smaller lambda than video signals encoding detailed scenes.

In turn, the entropy encoder 208 may encode the quantized coefficient block to provide an encoded bitstream. The entropy encoder 208 may be any entropy encoder known by those having ordinary skill in the art, such as a context-adaptive binary arithmetic coding (CABAC) encoder. The quantized coefficient block may also be inverse scaled and quantized by the inverse quantization block 210. The inverse scaled and quantized coefficients may be inverse transformed by the inverse transform block 212 to provide a reconstructed residual. The reconstructed residual may be added to the predictor at the adder 214 to provide a reconstructed video signal that may be provided to the filter 216. The filter 216 may be a blocking filter and/or a sample adaptive offset (SAO) filter in accordance with the HEVC coding standard. The filter 216 may filter the reconstructed video signal and the filtered signal may be written to the picture buffer 218 for use in future frames, and fed back to the mode decision block 230 for further prediction or other mode decision operations.

The quantization block 250 may provide a quantized coefficient block having optimized coefficients such that a cost (e.g., rate-distortion cost) associated with each coefficient is optimized. In one embodiment, for example, this optimization may be based on a Lagrangian cost function, such as lambda, that may be provided by the mode decision block 230. In another embodiment, the optimization may be based on the inverse of lambda, or inverse lambda. Lambda may be a rate factor for determining a cost (e.g., rate-distortion cost) for a signal. As described, lambda may be generated by the mode decision block 230 based on the incoming video signal, and may be fixed or adjusted in real-time.

The encoder 200 may operate in accordance with any known coding standard, including the HEVC coding standard. Thus, because the HEVC coding standard employs motion prediction and/or motion compensation, the encoder 200 may further include a feedback path that includes an inverse quantization block 210, an inverse transform 212, a reconstruction adder 214, and a filter 216. These elements may mirror elements of a decoder (not shown) that is configured to reverse, at least in part, the encoding process employed by the encoder 200. The feedback path of the encoder may further include a decoded picture buffer 218 an a prediction block 220.

In an example operation of the encoder 200, a video signal (e.g. a base band video signal) may be provided to the encoder 200. The video signal may be provided to the delay buffer 202 and the mode decision block 230. The subtractor 204 may receive the video signal from the delay buffer 202 and may subtract a prediction signal from the video signal to generate a residual signal. The residual signal may be provided to the transform 206 and processed using a forward transform, such as a DCT. As described, the transform 206 may generate a coefficient block that may be provided to the quantization block 250, and the quantization block 250 may quantize and/or optimize the coefficient block such that a cost of coefficients in the coefficient block are optimized. Quantization of the coefficient block may be based on lambda or inverse lambda. The quantized coefficient block may be provided to the entropy encoder 208 and the entropy encoder 208 may encode the quantized coefficient block to provide an encoded bitstream.

The quantized coefficient block may further by provided to the feedback path of the encoder 200. That is, the quantized coefficient block may be inverse quantized, inverse transformed, and added to the prediction signal by the inverse quantization block 210, the inverse transform 212, and the reconstruction adder 214, respectively, to provide a reconstructed video signal. Both the prediction block 220 and the filter 216 may receive the reconstructed video signal. Because the filter 216 may operate in accordance with the HEVC standard, the filter 216 may include a deblocking filter, a sample adaptive offset (SAO) filter, and/or an adaptive loop filter (ALF). The decoded picture buffer 218 may receive a filtered video signal from the filter 216. Based on the reconstructed and filtered video signals, the prediction block 220 may provide a prediction signal to the adder 204.

Accordingly, the encoder of FIG. 2 may provide a coded bitstream based on a video signal, where the coded bitstream is provided using coefficients which may be selected in accordance with embodiments of the present invention. The coded bitstream may be a CABAC bitstream. The encoder may be operated in semiconductor technology, and may be implemented in hardware, software, or combinations thereof. In some examples, the encoder may be implemented in hardware with the exception of the mode decision block that may be implemented in software. In other examples, other blocks may also be implemented in software, however software implementations may not achieve real-time operation.

Figure 3:
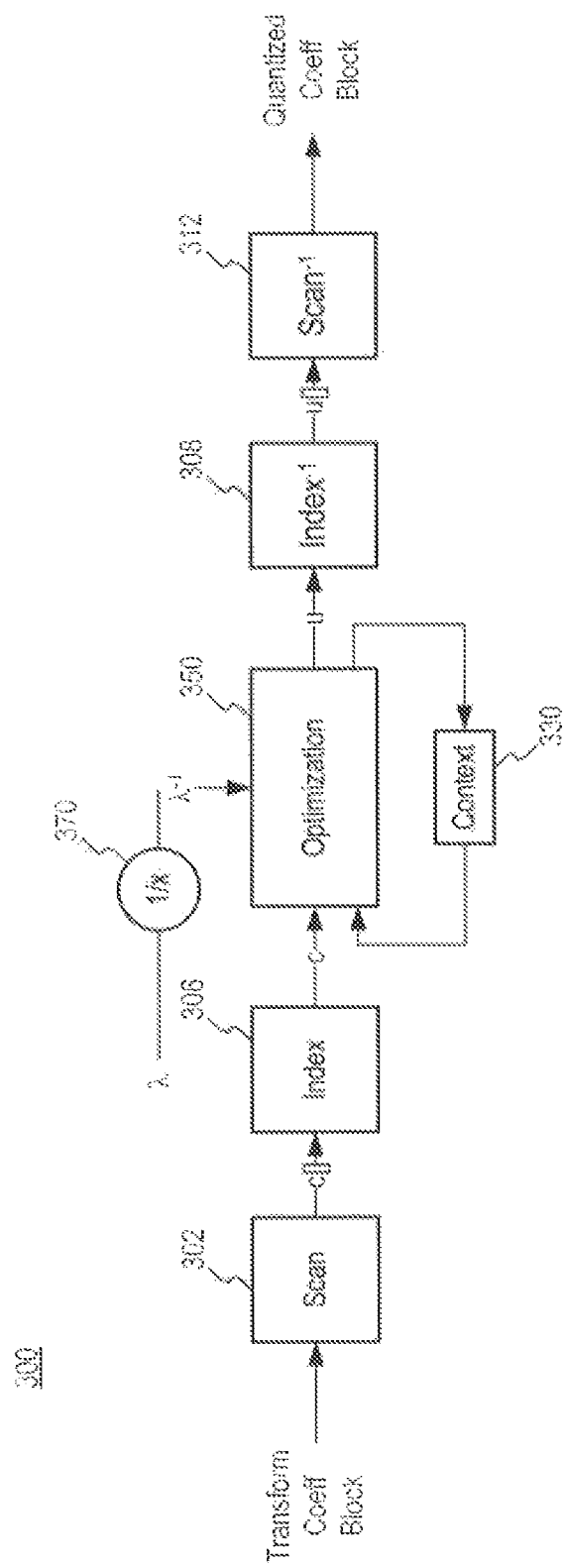
FIG. 3 is a schematic block diagram of a quantization block that may be used in the encoder of FIG. 2 according to an embodiment of the present invention.

FIG. 3 is a schematic block diagram of a quantization block 300 according to an embodiment of the invention. The quantization block 300 may be used to implement the quantization block 250 of FIG. 2. The quantization block 300 may receive a block of coefficients (e.g. coefficient block) and quantize the coefficients to generate a quantized coefficient block that may include selected quantized coefficients, e.g. optimized quantized coefficient. For example, the coefficient block received by the quantization block 250 may by provided by the transform 206, which may be a standard transform used in HEVC encoders. The coefficients may be quantized and optimized to generate a quantized coefficient block. In accordance with the HEVC standard, each coefficient block may correspond to a subblock of a coding tree unit.

In an example operation of the quantization block 300, a coefficient block may be provided to a forward ordering block 302 from a transform such as the transform 206 of FIG. 2. The forward ordering block 302 may convert the coefficients of the coefficient block to a coefficient vector using, for example, one or more scan operations to place the coefficients in bitstream coefficient order in accordance with the HEVC coding standard. Scan operations may include horizontal, vertical, and zigzag scan operations, and further may be employed recursively. The coefficients may then be sequentially provided to a remainder of the quantization block performing a block selection process. The selection process may utilize an initial CABAC context, and on processing a last coefficient, may provide a set of optimized, quantized coefficients (output as u[ ] in FIG. 3) and a new CABAC context. The optimized, quantized coefficients may optionally be inverse scanned and output as a quantized coefficient block.

Accordingly, the coefficient vector c[ ] may be indexed by the forward index block 306, for instance, to reduce the number of possible coefficient values and/or the amount of data required to represent each coefficient value. The indexed coefficient vector may then be provided to the block optimization circuit 350, such that coefficients may be received one at a time.

The inverter 370 may receive lambda, and may provide inverse lambda to the optimization block 350. Based on the inverse lambda and a context (e.g., CABAC context) received from the context register 330, the optimization block 350 may receive the coefficient vector and provide an optimized quantized coefficient vector. In some embodiments, the optimization block 350 may receive lambda directly from a mode decision block and may optimize the coefficients based, at least in part, on lambda or inverse lambda. Moreover, the context received by the optimization block 350 from the context register 330 may be an initial context, and in selecting the coefficients, the block optimization circuit 350 may iteratively provide the context register 330 with an updated context as each coefficient is quantized and/or optimized. The updated context provided to the context register 330 may be used in quantizing and/or optimizing the next coefficient of the coefficient vector, and/or may be used an as initial context for other coefficient vectors, as will be described further below.

The reverse index block 308 may subsequently rescale the optimized quantized coefficient vector, and the inverse ordering block 312 may convert the vector to a quantized coefficient block by performing an inverse scan operation. The quantized coefficient block may be provided to an entropy encoder, such as the entropy encoder 208 of FIG. 2, and encoded in accordance with one or more encoding methods.

In this manner, examples of optimized quantization blocks described herein may process coefficients using one cycle per coefficient, resulting in a bounded time optimization. Any number of coefficients may be processed per block, however generally a fixed number of coefficients are provided per block, such as, but not limited to, 16 coefficients per block.

Figure 4:
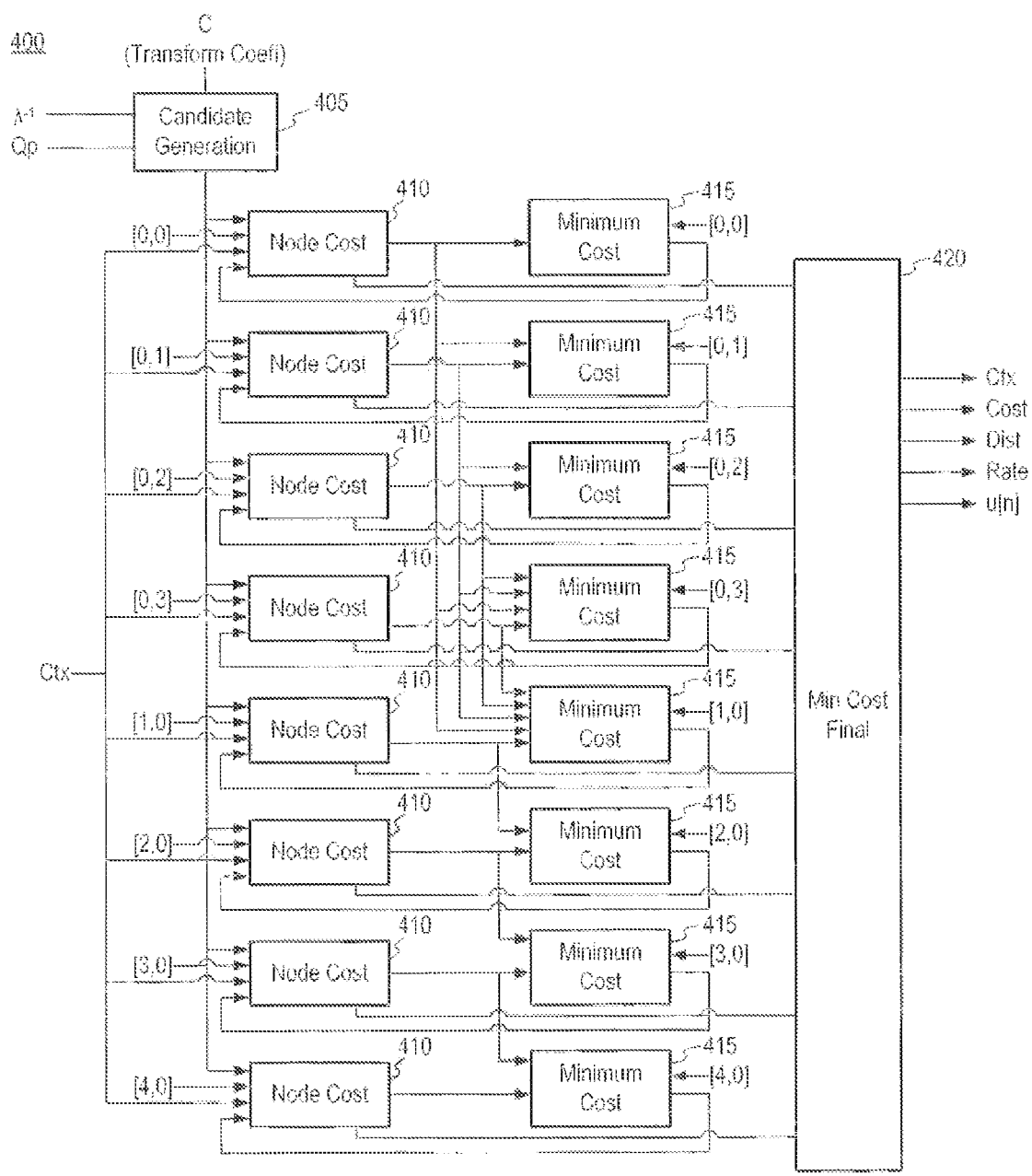
FIG. 4 is a schematic block diagram of an optimization block that may be used in the quantization block of FIG. 3 according to an embodiment of the present invention.

FIG. 4 is a schematic block diagram of an optimization block 400 according to an embodiment of the invention. The optimization block 400 may be used to implement the optimization block 350 of FIG. 3 and further may be used in the quantization block 250 of FIG. 2. The optimization block 400 may include a candidate generation block 405, a plurality of node cost blocks 410, a plurality of minimum cost blocks 415, and a final minimum cost block 420. As shown, elements of the optimization block 400, such as the plurality of node cost blocks 410 and plurality of minimum cost blocks 415, may be arranged in a trellis configuration. In at least one embodiment, this may allow for coefficients to be selected (e.g., optimized) using one or more dynamic programming methods. Generally, each coefficient may be received at the optimization block 400 in coding order. Multiple candidates of quantized coefficients may be provided, as described further below, along with an associated distortion cost. The candidates may be provided to node cost blocks 410 (there may be one such block per possible coding state), and the node cost blocks 410 may calculate a cost of each candidate given the node state. The node cost blocks 410 may add the calculated cost to the current node cost, update the context, and determine a next state for the candidate. Minimum costs may then be determined for each destination state, and that minimum cost provided back to the node cost block 410. In some examples, other criteria may be used to select and/or provide a cost. After the last coefficient has been received, the nodes may be evaluated to determine which has the minimum cost, and the context, cost, rate distortion, and list of quantized coefficients of the lowest cost node may be provided by the optimization block 400.

For example, the candidate generation block 405 may be configured to receive sequentially provided coefficients from the index 306 of FIG. 3, lambda or inverse lambda, and $Q_p$, a standard quantization parameter. The candidate generation block may provide a plurality of candidates ($u_0$, $u_1$, $u_2$, $u_3$ . . . ) for each coefficient in the coefficient vector, as will be described further below. Any number of candidates may generally be provided, for example three candidates may be provided in the example of FIG. 4, however other number of candidates may be used. The candidate generation block 405 may further provide a distortion cost ($D_0$, $D_1$, $D_2$, $D_3$ . . . ) for each candidate. Each node cost block 410 may be coupled to the candidate generation block 405 and correspond to a unique node state. For example, as illustrated in FIG. 4, the plurality of node cost blocks 410 may include eight node cost blocks 410 corresponding to the node states [0,1], [0,2], [0,3], [0,0], [1,0], [2,0], [3,0], and [4,0] respectively. A node state may, for instance, for defined by a NodeID control signal received by the node cost blocks 410. Each node cost block 410 may receive all the candidates and associated distortion costs from the candidate generation block 405. In the example of FIG. 4, each of the node cost blocks 410 may receive the candidates $u_0$, $u_1$, $u_2$, and $u_3$ in parallel along with their respective distortion costs $D_0$, $D_1$, $D_2$, and $D_3$. Accordingly, a connection between the candidate generation block 405 and the node cost blocks 410 may be as wide as the number of candidates, e.g. four wires wide and/or provide capacity for a sufficient number of bits. The node cost blocks 410 may also receive the current context (Ctx) and a nodeID signal specifying the state. Each node cost block 410 may then provide an arc for each candidate. Each arc may be a set of respective values and/or include a context, a cost, a distortion cost, a rate cost, a state, and a path including coefficients contributing to the arc.

The minimum cost blocks 415, which may correspond in number to the node cost blocks 410 and may also correspond to the unique node states, may each receive a plurality of arcs and determine which arc has a lowest cost. The particular node cost blocks 410 coupled to the minimum cost blocks 415 may be determined by allowable state transitions of the encoding method as described further below. Each of the minimum cost blocks 415 may further provide the lowest cost arc that was input to the minimum cost block 415 to a node cost block 410 having a same node state. Each node cost block 415 may update the received arc by adding respective costs of the arc to costs of new candidates as well as append each candidate to a path of the arc. The final minimum cost block 420 may receive the lowest cost arcs for each node state and identify an arc having the overall lowest cost, and may further provide the corresponding context, cost, rate cost, distortion cost, and path of the arc from the optimization block 400. The context may, for example, be provided to a context register, such as the context register 330 of FIG. 3 to be used in a subsequent block optimization.

In an example operation of the optimization block 400, a first coefficient of a coefficient vector may be received at the candidate generation block 405, and the candidate generation block 405 may provide a plurality of candidates corresponding to the coefficient. In at least one embodiment, the candidates may be based, at least in part, on a quantization parameter Qp and/or inverse lambda, as will be described further below. The quantization parameter may be indicative of a resolution factor for quantization. In addition to providing the plurality of candidates, the candidate generation block 405 may further provide a plurality of distortion costs corresponding to the plurality of candidates respectively. The candidate generation block 405 may provide four candidates and/or distortion costs for each coefficient, but embodiments of the invention should not be limited to a particular number, as other implementations may be used without departing from the scope and spirit of the invention.

Each candidate and distortion cost, in addition to an initial context and a respective node state, may be provided from the candidate generation block 405 to each of a plurality of node cost blocks 410. An arc for each candidate may be generated by each of the plurality of node cost blocks 410 based on the node state of each node cost block 410, the initial context, and the distortion cost of each candidate.

Each arc may be provided to one or more of a plurality of minimum cost blocks 415 based on the node state of each node cost block 410 and each minimum cost block 415. For example, as will be explained in more detail below, to reduce the number of potential paths, the node cost blocks 410 may provide arcs to particular minimum cost blocks 415 based on a state transition scheme, such as a state transition scheme according to the HEVC standard. Once each minimum cost block 415 has received its respective arc(s) from one or more of the node cost blocks 410, each minimum cost block 415 may determine which received arc has the lowest cost.

Each minimum cost block 415 may provide its lowest cost arc to the node cost block 410 of the same node state. New candidates and distortion costs corresponding to the next coefficient may also be received by the node cost blocks 410. Based, at least in part, on the received arcs, new candidates, and distortion costs, updated arcs may be provided to respective minimum cost blocks 415. The updated arcs may include a cost for the current candidate added to a previous fed-back cost, a next state for the candidate, and the candidate coefficient appended to a list of coefficients from the fed-back arc. Again, each minimum cost block 415 may determine which arc has the lowest cost and provide the lowest cost arc to the node cost block 410 having the same node state. This process may be iteratively repeated until candidates for all coefficients of a coefficient vector have been considered. The final minimum cost arcs for each node cost block 410 may be provided to the final minimum cost block 420, which may determine which arc has the lowest cost. The final list of appended coefficients in the selected lowest cost arc may be output (e.g. u[n] in FIG. 4), along with the cost, distortion cost, and rate cost specified by the selected lowest cost arc, and the context. The context may be stored in a register, e.g. the register 330 of FIG. 3, which may be used in subsequent block optimizations as input (e.g. ctx) to the optimization block 400. Although shown as "minimum cost" blocks in FIG. 4 and described as selecting an arc having a lowest cost, in other examples, the decision blocks in FIG. 4 may select an arc meeting a different selection criteria (e.g. second-lowest cost).

Figure 5:
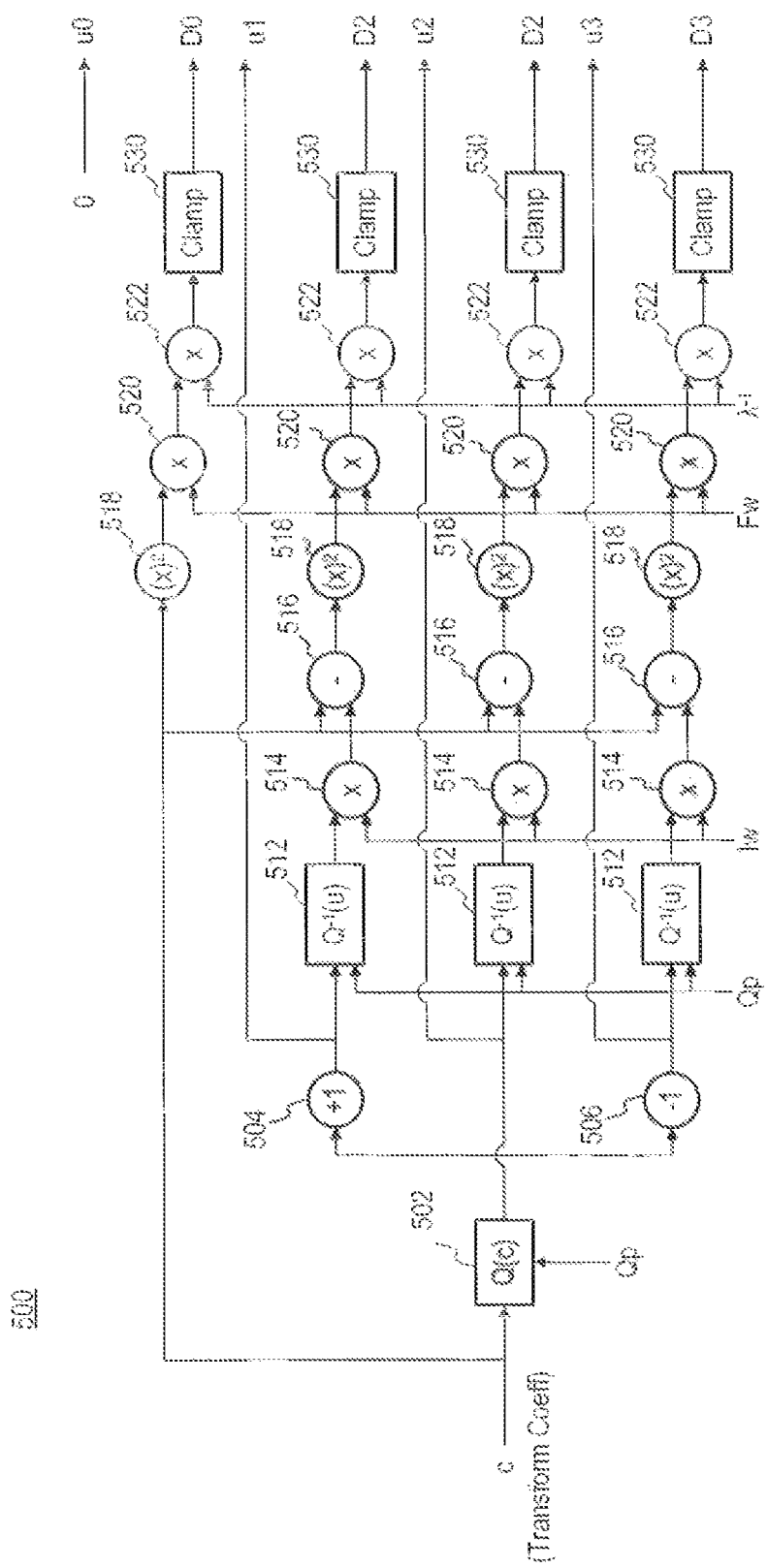
FIG. 5 is a schematic block diagram of a candidate generation block that may be used in the optimization circuit of FIG. 4 according to an embodiment of the present invention.

FIG. 5 illustrates a schematic block diagram of a candidate generation block 500 according to an embodiment of the invention. The candidate generation block 500 may be used to implement the candidate generation block 405 of FIG. 4. As described, the candidate generation block 405 may receive coefficients of a coefficient vector and generate a plurality of candidates and distortion costs for each coefficient. Generally, the candidate generation block 500 may function to perform a forward quantization (e.g. HDQ) on an unquantized transform coefficient, based on the quantization parameter Qp. Multiple additional candidates are generated and inverse quantized to provide scaled coefficients. The scaled coefficients may be further scaled by an inverse weight factor to allow for scaling that would occur as part of the inverse transform in a decoder. The scaled and weighted coefficients may be subtracted from the original coefficient and the difference squared. The squared differences may then be scaled by a forward weight to account for imperfect integer transform used in HEVC encoding, then multiplied by inverse lambda and clamped to a particular bit width to yield each candidate. A zero candidate and associated distortion cost may also be provided for each coefficient. The original coefficient may be squared, forward weighted, multiplied by inverse lambda, and clamped to provide the distortion cost for the zero candidate.

In an example operation of the candidate generate block 500, each coefficient of a coefficient vector may be sequentially provided to the candidate generation block 500, and in particular to the forward quantization block 502. As known, the forward quantization block 502 may quantize each coefficient based, in least in part, on the quantization parameter Qp, to generate a quantized coefficient in accordance with one or more quantization methods. A plurality of candidates may be generated based, at least in part, on the quantized coefficient and provided from the candidate generation block 500, for instance, to a plurality of node cost blocks as described above. In one embodiment, the plurality of candidates may include the quantized coefficient as well as the quantized coefficient having increased and decreased quantization levels, respectively. The increased and decreased quantization level candidates may be provided by the candidate generation blocks 504, and 506, respectively.

A distortion cost for each candidate may also be generated by the candidate generation block 500. By way of example, an inverse quantization block 512 may be used to inverse quantized each of the candidates, respectively. Each candidate may further be scaled with an inverse weight at respective inverse weight blocks 514 to produce reconstructed candidates, which may subsequently be subtracted (e.g. using block 516) from the coefficient to generate a residual error between the coefficient and reconstructed candidate. Each error may be squared (e.g. using block 518), forward weighted (e.g. using block 520), and multiplied by inverse lambda (e.g. using block 522) to provide respective distortion costs for each candidate. The bit width for each distortion cost may be truncated by a clamp 530. Generally any number of bits may be set by the clamp, e.g. 25 bits in one example. As described, a zero coefficient and association distortion cost may also be provided. In some examples, inverse lambda may vary by coefficient, and utilizing candidate generation as described and shown with FIG. 5 using inverse lambda may allow for per-coefficient lambda variation. Without the use of inverse lambda, lambda itself is typically applied after a rate is calculated, which may require a greater number of multiplications and may not permit per-coefficient lambda variation.

Figure 6:
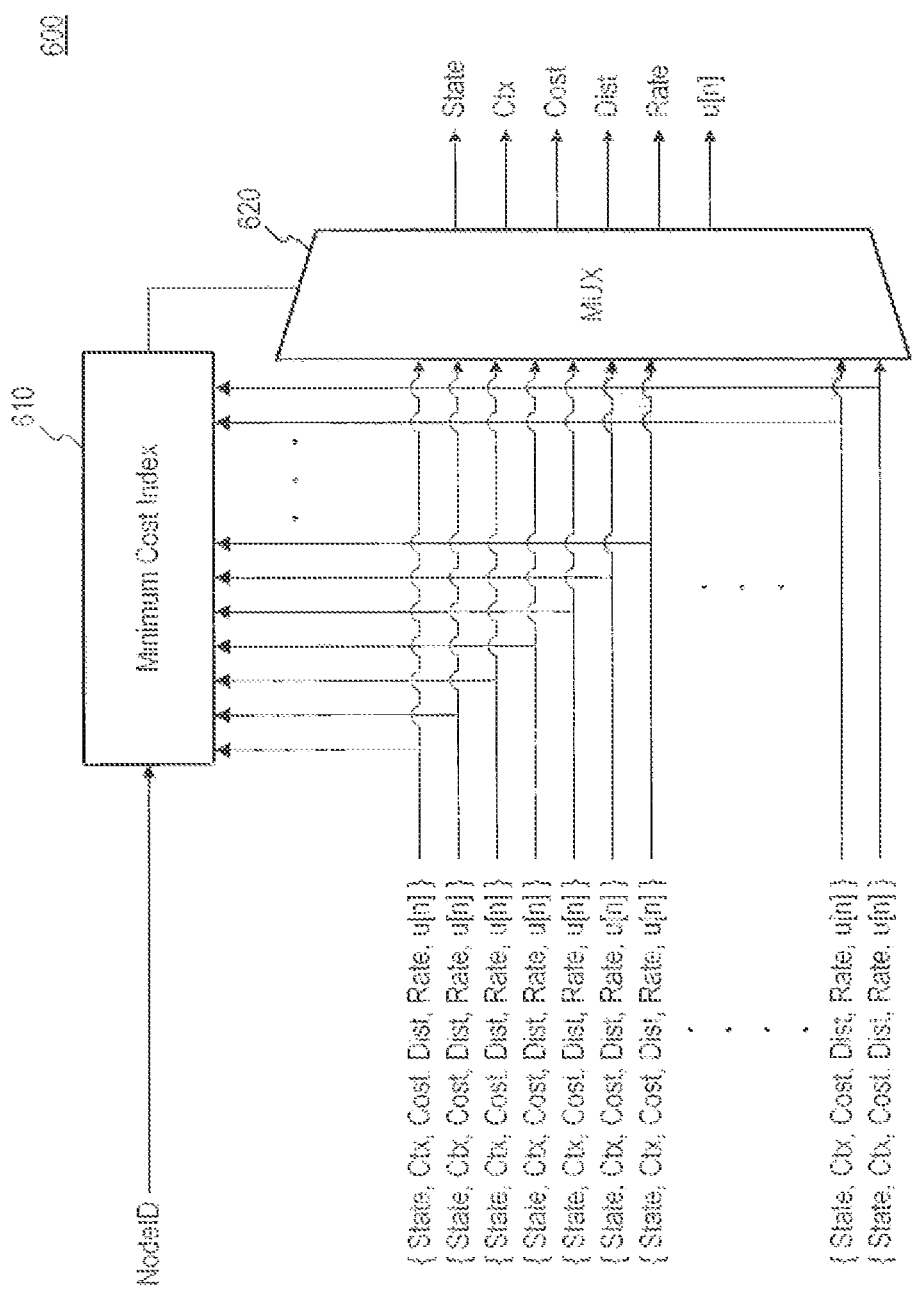
FIG. 6 is a schematic diagram of a minimum cost block that may be used in the optimization circuit of FIG. 4 according to an embodiment of the present invention.

FIG. 6 is a schematic diagram of a minimum cost block 600 according to an embodiment of the invention. The minimum cost block 600 may be used to implement the minimum cost block 415 of FIG. 4. The minimum cost block 600 may include a minimum cost index 610 and a multiplexer 620. The minimum cost block 600 may receive a control signal NodeID that in at least one embodiment, may assign a node state to the minimum cost block 600. Both the minimum cost index 610 and the multiplexer 620 may receive one or more arcs, for instance, from one or more node cost blocks, such as the node cost blocks 410 of FIG. 4. The minimum cost index 610 may determine which of the received arcs have states corresponding to the node state of the minimum cost block 600, and of those arcs, which has the lowest cost. The minimum cost index 610 may further cause the multiplexer 620 to selectively output the arc having the lowest cost responsive, at least in part, to determining which arc has the lowest cost. In this manner, only candidates transitioning into a desired state need be evaluated.

Figure 7:
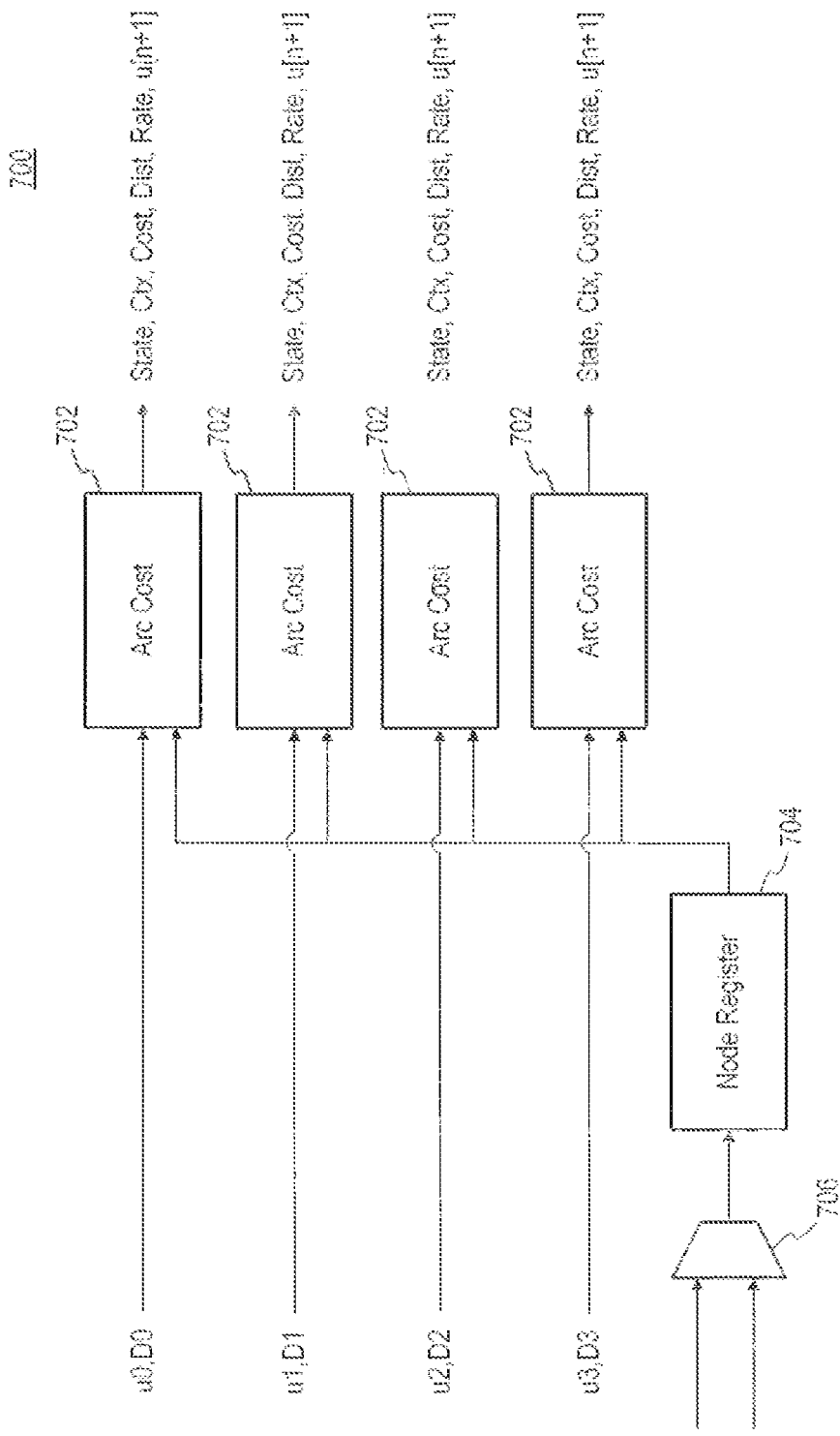
FIG. 7 is a schematic diagram of a node cost block that may be used in the optimization block of FIG. 4 according to an embodiment of the present invention.

FIG. 7 is a schematic diagram of a node cost block 700 according to an embodiment of the invention. The node cost block 700 may be used to implement the node cost block 410 of FIG. 4. The node cost block 700 may include a plurality of arc cost blocks 702 (e.g. registers), a node register 704, and a multiplexer 706. The multiplexer 706 may receive an initial context and an arc, and may provide the initial context or arc to the node register 704. The node register 704 may receive and store the initial context or arc provided by the multiplexer 706.

The plurality of arc cost blocks 702 may correspond in number to the number of candidates generated for each coefficient, for instance, by a candidate generation block, and accordingly, each of the plurality arc cost blocks 702 may receive a candidate and distortion cost. Each arc cost block 702 may receive the initial context or arc from the node register 704 and may provide an updated arc for each respective candidate.

As an example, during an initialization, an initial context may be provided to the multiplexer 706, which may in turn selectively provide the initial context to the register 704. Candidates and distortion costs for a first coefficient may be generated, for example, by a candidate generation block 405 of FIG. 4, and provided to the node cost block 700. Respective candidates and distortion costs as well as the initial context in the register 704 may be provided to each of the plurality of arc cost blocks 702. Based on the candidates, distortion costs, and the initial context, each arc cost block 702 may provide an arc.

As described above with respect to FIG. 4, minimum cost blocks 415 may provide lowest cost arcs to node cost blocks responsive, at least in part, to identifying the lowest cost arc, and responsively, node cost blocks 410 may provide updated arcs. However, for candidates based on the first coefficient, respective node cost blocks may not have yet received an arc. Accordingly, for candidates corresponding to the first coefficient, a node cost block may provide an arc based, at least in part, on the initial context as well as initial values (e.g., zero) for other parameters of an arc (e.g., cost, rate cost, distortion cost, path, and/or state). In one embodiment, initial values for these parameters may be provided with the initial context, for example, from the node register 704.

Once arcs have been generated for the first candidates, each of the arcs may be provided to one or more minimum cost blocks 415, and an arc having the lowest cost for each node state may be provided to the node cost block 410 having the same node state, as described. Thus, in a least one embodiment, an arc determined to have the lowest cost for a particular node state may be provided to a node cost block 700, and in particular to the multiplexer 706. The multiplexer 706 may selectively provide the arc to the register 704, which may in turn provide the arc to the arc cost blocks 702. The arc cost blocks 702 may receive new respective candidates and distortion costs for a subsequent coefficient, and again provide updated arcs. The arc cost blocks 702 may receive lowest cost arcs, new candidates and distortion costs, and responsively provide updated arcs until candidates for all coefficients of a coefficient vector have been considered.

Figure 8:
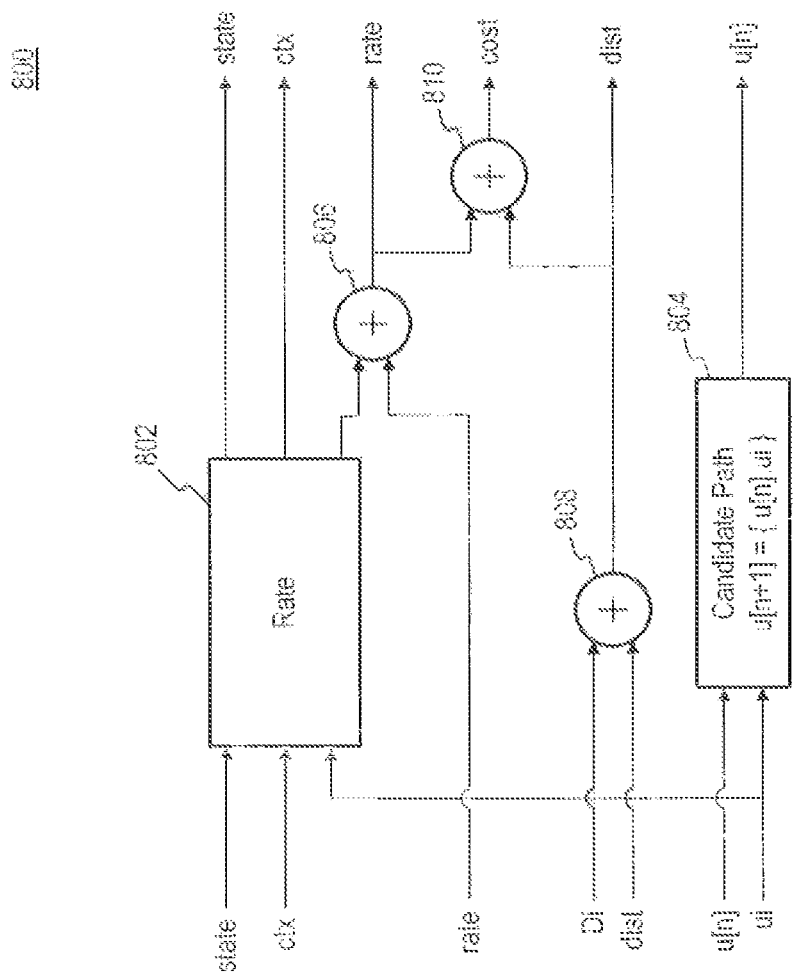
FIG. 8 is a schematic diagram of an arc cost block that may be used in the node cost block of FIG. 7 according to an embodiment of the present invention.

FIG. 8 is a schematic diagram of an arc cost circuit 800 according to an embodiment of the invention. The arc cost block 800 may be used to implement the arc cost block 702 of FIG. 7. The arc cost block 800 may include a rate block 802, adders 806, 808, 810, and a candidate path block 804, and may provide an updated arc responsive, at least in part, to receipt of a candidate. The arc cost block 800 may, for example, combine various costs (e.g., distortion costs, rate costs, and/or rate-distortion costs) of an arc and the candidate respectively, and further may provide a new state, context, and path for the updated arc.

In an example operation of the arc cost block 800, a candidate, and a state and context of an arc may be provided to the rate block 802. The state may be based, for instance, on a state transition scheme in accordance with the HEVC coding standard, and the rate block 802 may determine a next state based on the state and/or the candidate. The rate block 802 may further determine a rate cost of the candidate and/or context for a new arc. In one embodiment, for example, the rate block 802 may determine the rate cost of the candidate and/or context using estimation tables for one or more coding standards, such as the HEVC coding standard.

The rate cost of the candidate may be combined with the rate cost of the arc by the adder 806. Moreover, the distortion cost may be combined with the distortion cost included in the arc by the adder 808. An adder 810 may combine the combined distortion cost and the combined rate cost to generate a cost for the updated arc. Finally, the candidate path block 804 may receive the path of the arc and the candidate, and append the current candidate to the path. This may, for example, maintain a complete list of the candidates used in a path, and should a particular arc have the overall lowest cost, the candidates includes in the path may be provided as optimized quantized coefficients as described above.

Figure 9:
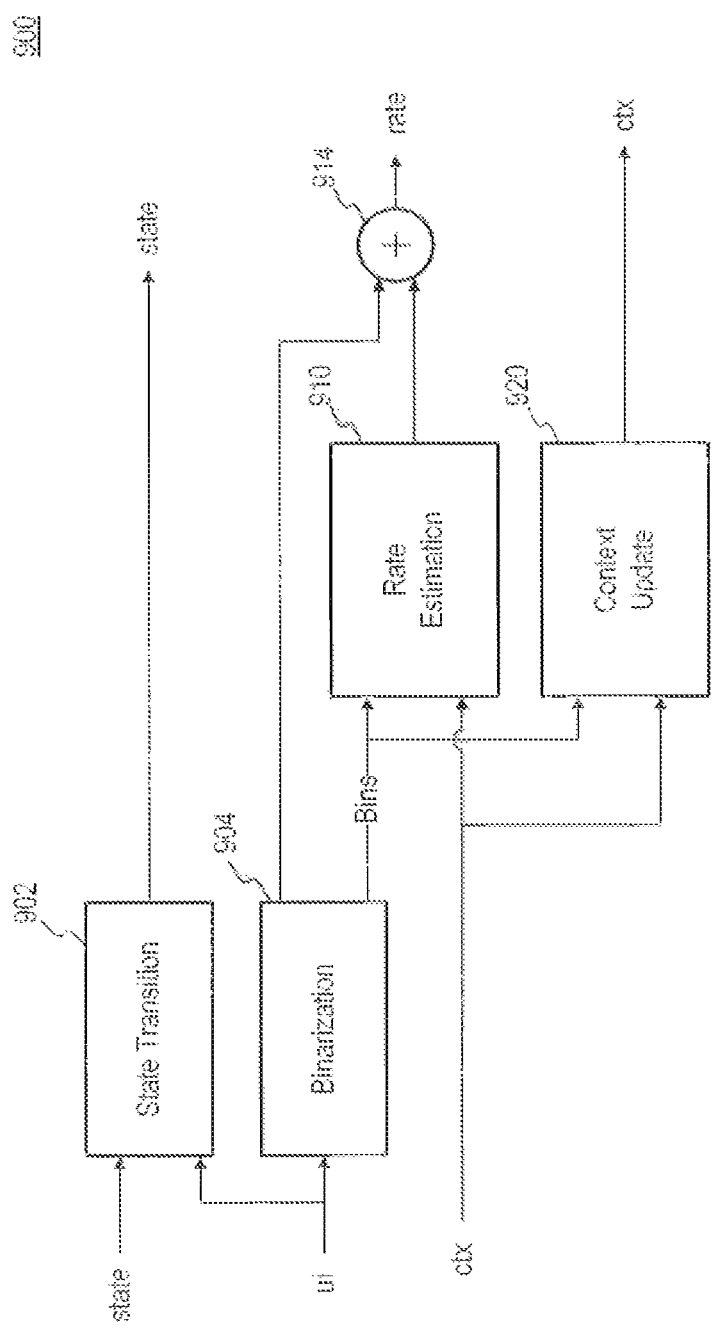
FIG. 9 is a schematic diagram of a rate block that may be used in the arc cost block of FIG. 8 according to an embodiment of the present invention.

FIG. 9 is a schematic diagram of a rate block 900 according to an embodiment of the invention. The rate block 900 may be used to implement the rate block 802 of FIG. 8. The rate block 900 may include a state transition block 902, a binarization block 904, an adder 914, estimation table 910, and update table 920.

The state transition block 902 may generate a new state responsive to receipt of a state and a candidate. The new state may be generated in accordance with a state transition scheme, and/or the candidate value. The binarization block 904 may receive the candidate and perform a binarization on the candidate in accordance with binarization of the HEVC coding standard. As known, this binarization process may derive a bypass bitcount and a bincount. The bypass bitcount is a number bypass bits represented by the coefficient, while the bincount provides a number of bins represented by the coefficient. The bins may each have a particular number of bits.

The estimation table 910 and the update table 920 may receive the bincount and a context for an arc and further may be implemented using look-up tables. Given a context and a bin, the estimation table 910 may provide an estimated CABAC rate and the update table 920 may provide an updated context. Use of look-up tables may allow for rates to be estimated fractionally.

Rates provides by the estimation table 910 may be combined with the bypass bitcount by the adder 914 to obtain the rate. That is, rate cost estimations (e.g., fractional bit rate cost estimations) in the estimation table 910 may be combined with the bypass bitcount at the adder 914 to provide a rate cost for a candidate. In at least one embodiment estimating the rate costs for CABAC encoding may mitigate and/or eliminate the need for arithmetic coding to determine the rate cost for each candidate. This may decrease the time required to determine a rate cost for a candidate, and accordingly may allow for operation within tighter performance tolerances. Utilization of the look-up tables described may facilitate real-time operation of the systems and methods described herein. Techniques utilizing arithmetic encoding may not be able to implement real-time operation.

Figure 10:
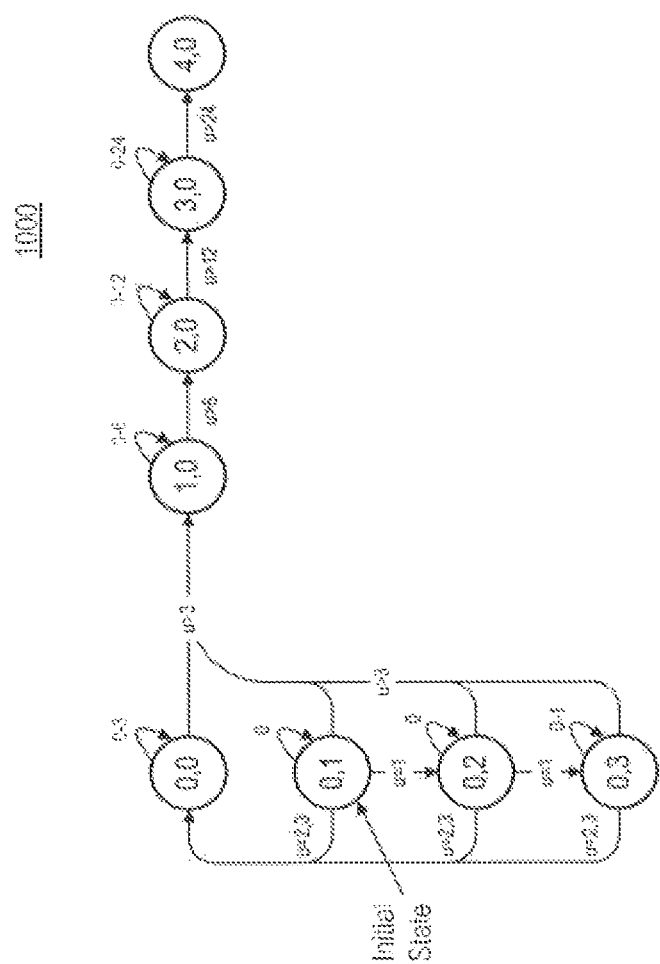
FIG. 10 is a state diagram according to an embodiment of the present invention.

FIG. 10 is a state diagram 1000 for node states according to an embodiment of the invention. The state transition scheme of the state diagram 1000 may govern permitted state transitions of states received by the rate block 902 of FIG. 9 and further may be arranged in accordance with the HEVC coding standard. Generally, a state may change based on the value of a candidate and in some examples, on the absolute value of the candidate. In one embodiment, for example, a state transitions may be governed by the following pseudocode:

```
if( s == [r,c] && u > (3<<r))
    then NEXT(s,u) = [min(4,r+1),0]
else if( s == [0,c] && u > 1)
    then NEXT(s,u) = [0:0]
else if( s == [0,c] && c > 0 && u == 1 )
    then NEXT(s,u) = [0,min(3,c+1)]
else NEXT(s,u) = s
``` where 's' may be a state, 'u' may be an absolute value of a candidate value, 'r' may be an HEVC Rice parameter, and 'c' may be a CABAC context variable (e.g., greater1ctx). It will be appreciated, however, that other state transition schemes may be specified and used to govern state transitions without departing from the scope of the spirit of the invention.

Moreover, as explained above with respect to FIGS. 4 and 6, respectively, in at least one embodiment, node cost blocks 410 may provide arcs only to particular minimum cost blocks 415, and only arcs received by a minimum cost block 600 having a state corresponding to the node state of the minimum cost block 600 may be considered in determining which, of any received arcs has the lowest cost. This follows from the fact that states may transition according to the state diagram 1000 illustrated in FIG. 10. For example, a state of [0,1] may remain at a state of [0,1] if a candidate has a value of 0, or transition to a state of [0,2], [0,0], or [1,0] if a candidate has an absolute value of 1, 2 or 3, or greater than 3, respectively. Accordingly, the node cost block 410 (FIG. 4) having a node state of [0,1] may provide arcs to minimum cost blocks 415 having node states of [0,2], [0,0], or [1,0]. Each of those minimum cost blocks 415 receiving the arcs may then determine whether any of the states of the arcs match their respective node state.

Figure 11:
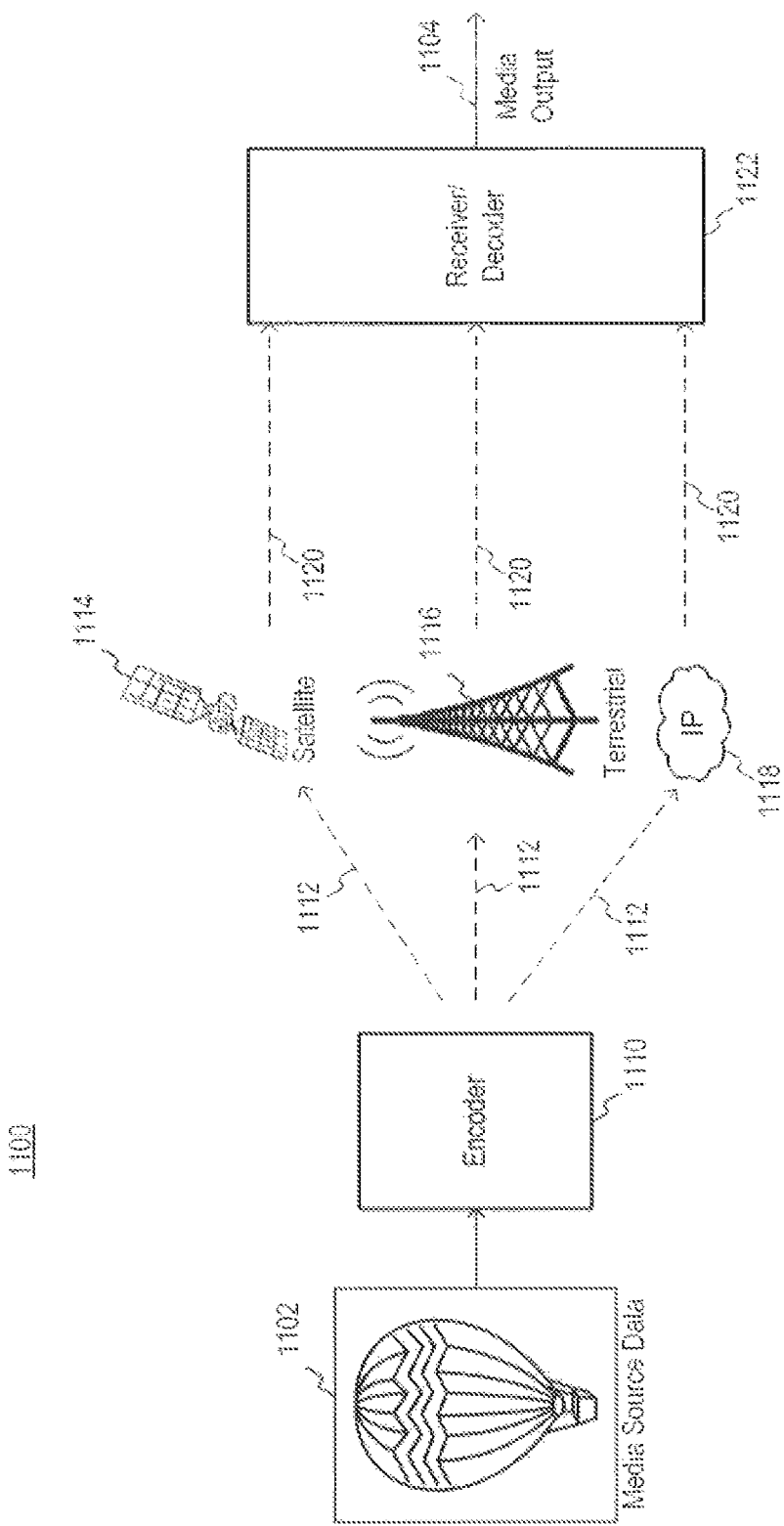
FIG. 11 is a schematic illustration of a media delivery system according to an embodiment of the present invention.

FIG. 11 is a schematic illustration of a media delivery system 1100 in accordance with embodiments of the present invention. The media delivery system 1100 may provide a mechanism for delivering a media source 1102 to one or more of a variety of media output(s) 1104. Although only one media source 1102 and media output 1104 are illustrated in FIG. 11, it is to be understood that any number may be used, and examples of the present invention may be used to broadcast and/or otherwise deliver media content to any number of media outputs.

The media source data 1102 may be any source of media content, including but not limited to, video, audio, data, or combinations thereof. The media source data 1102 may be, for example, audio and/or video data that may be captured using a camera, microphone, and/or other capturing devices, or may be generated or provided by a processing device. Media source data 1102 may be analog and/or digital. When the media source data 1102 is analog data, the media source data 1102 may be converted to digital data using, for example, an analog-to-digital converter (ADC). Typically, to transmit the media source data 1102, some mechanism for compression and/or encryption may be desirable. Accordingly, an apparatus 1100 may be provided that may filter and/or encode the media source data 1102 using any methodologies in the art, known now or in the future, including encoding methods in accordance with standards such as, but not limited to, MPEG-2, MPEG-4, H.263, MPEG-4 AVC/H.264, HEVC, VC-1, VP8 or combinations of these or other encoding standards. The apparatus 1110 may be implemented with embodiments of the present invention described herein. For example, the apparatus 1110 may be implemented using the apparatus 100 of FIG. 1.

The encoded data 1112 may be provided to a communications link, such as a satellite 1114, an antenna 1116, and/or a network 1118. The network 1118 may be wired or wireless, and further may communicate using electrical and/or optical transmission. The antenna 1116 may be a terrestrial antenna, and may, for example, receive and transmit conventional AM and FM signals, satellite signals, or other signals known in the art. The communications link may broadcast the encoded data 1112, and in some examples may alter the encoded data 1122 and broadcast the altered encoded data 1112 (e.g. by re-encoding, adding to, or subtracting from the encoded data 1112). The encoded data 1120 provided from the communications link may be received by a receiver 1122 that may include or be coupled to a decoder. The decoder may decode the encoded data 1120 to provide one or more media outputs, with the media output 1104 shown in FIG. 11. The receiver 1122 may be included in or in communication with any number of devices, including but not limited to a modem, router, server, set-top box, laptop, desktop, computer, tablet, mobile phone, etc.

The media delivery system 1100 of FIG. 11 and/or the apparatus 1110 may be utilized in a variety of segments of a content distribution industry.

Figure 12:
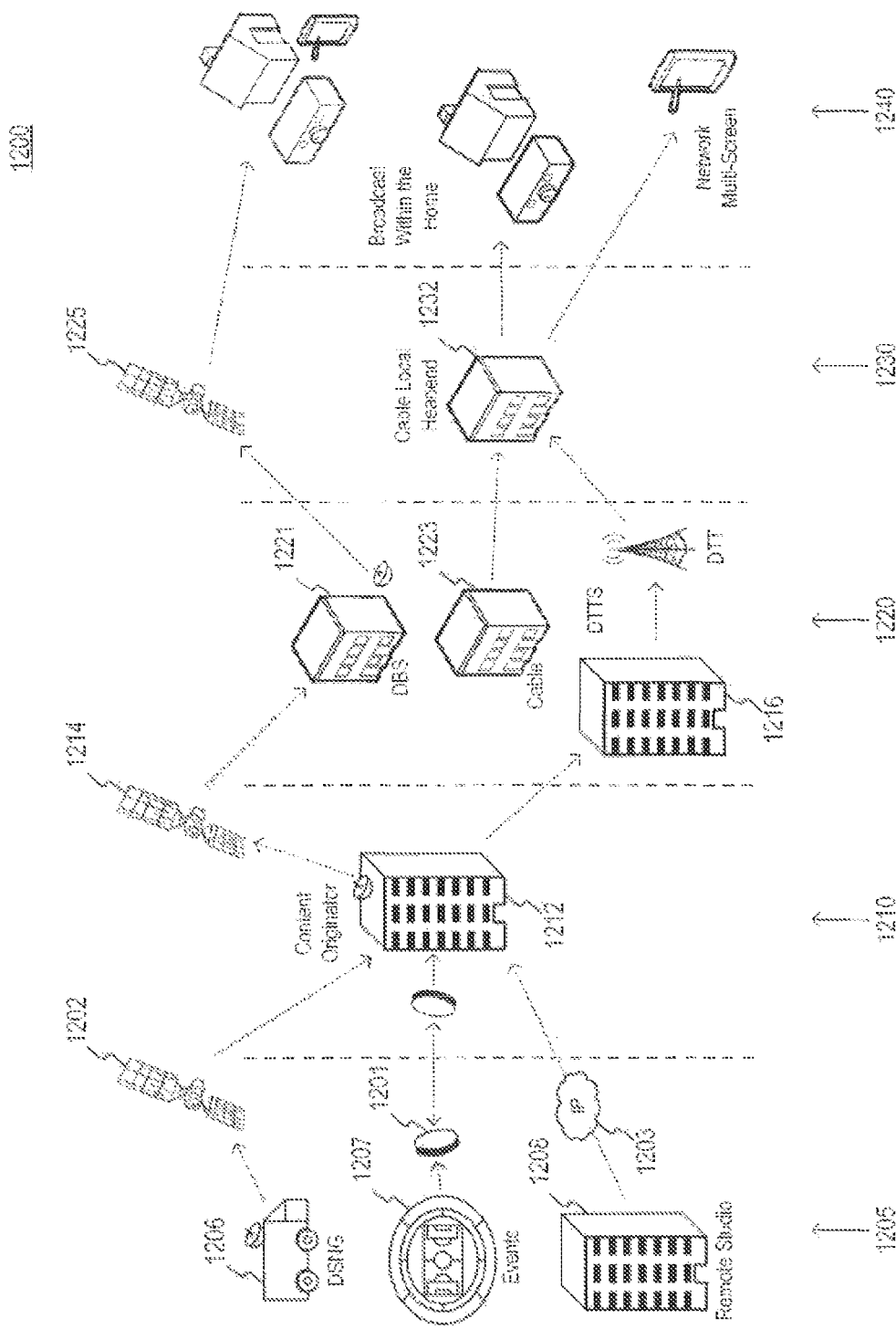
FIG. 12 is a schematic illustration of a video distribution system that may make use of apparatuses described herein.

FIG. 12 is a schematic illustration of a video distribution system 1200 that may make use of apparatuses described herein. The video distribution system 1200 includes video contributors 1205. The video contributors 1205 may include, but are not limited to, digital satellite news gathering systems 1206, event broadcasts 1207, and remote studios 1208. Each of any of these video contributors 1205 may utilize an apparatus described herein, such as the apparatus 100 of FIG. 1, to encode media source data and provide encoded data to a communications link. The digital satellite news gatherings system 1206 may provide encoded data to a satellite 1202. The event broadcast 1207 may provide encoded data to an antenna 1201. The remote studio 1208 may provide encoded data over a network 1203.

A production segment 1210 may include a content originator 1212. The content originator 1212 may receive encoded at from any or combinations of the video contributors 1205. The content originator 1212 may make the received content available, and may edit, combine, and/or manipulate any of the received content to make the content available. The content originators 1212 may utilize apparatuses described herein, such as the apparatus 100 of FIG. 1, to provide encoded data to the satellite 1214 (or another communications link). The content originator 1212 may provide encoded data to a digital terrestrial television system 1216 over a network or other communications link. In some examples, the content originator 1212 may utilize a decoder to decode the content received from the contributor(s) 1205. The content originator 1212 may then re-encode data and provide the encoded data to the satellite 1214. In other examples, the content originator 1212 may not decode the received data, and may utilize a transcoder to change a coding format of the received data.

A primary distribution segment 1220 may include a digital broadcast system 1221, the digital terrestrial television system 1216, and/or a cable system 1223. The digital broadcasting system 1221 may include a receiver, such as the receiver 1122 described with reference to FIG. 11, to receive encoded data from the satellite 1214. The digital terrestrial television system 1216 may include a receiver, such as the receiver 1122 described with reference to FIG. 11, to receive encoded data from the content originator 1212. The cable system 1223 may host its own content which may or may not have been received from the production segment 1210 and/or the contributor segment 1205. For example, the cable system 1223 may provide its own media source data 1102 as that which was described with reference to FIG. 11.

The digital broadcast system 1221 may include an apparatus, such as the apparatus 1110 described with reference to FIG. 11, to provide encoded data to the satellite 1225. The cable system 1223 may include an apparatus, such as the apparatus 100 of FIG. 1, to provide encoded data over a network or other communications link to a cable local headend 1232. A secondary distribution segment 1230 may include, for example, the satellite 1225 and/or the cable local headend 1232.

The cable local headend 1232 may include an apparatus, such as the apparatus 10 of FIG. 1, to provide encoded data to clients in a client segment 1240 over a network or other communications link. The satellite 1225 may broadcast signals to clients in the client segment 1240. The client segment 1240 may include any number of devices that may include receivers, such as the receiver 1122 and associated decoder described with reference to FIG. 11, for decoding content, and ultimately, making content available to users. The client segment 1240 may include devices such a set-top boxes, tablets, computers, servers, laptops, desktops, cell phones, etc.

Accordingly, embodiments of the present invention include systems and methods that may optimize coefficients using a lambda-weighted rate-distortion cost equation. Embodiments may be used for real-time encoders, such as real-time CAVLC and/or CABAC encoders, and may employ fractional bit estimations and inverse lambda.

From the foregoing it will be appreciated that, although specific embodiments of the invention have been described herein for purposes of illustration, various modifications may be made without deviating from the spirit and scope of the invention. Accordingly, the invention is not limited except as by appended claims.

What is claimed is:

1. An encoder, comprising:
    a memory; and
    a processor configured to receive a video signal and provide a residual indicative of a difference between the video signal and a reconstructed video signal,
    the processor further configured to perform a transform on the residual to provide a plurality of transform coefficients and rate-distortion optimize the plurality of transform coefficients in accordance with an HEVC state transition scheme to provide a rate-distortion optimized plurality of quantized coefficients,
    the processor further configured to encode the plurality of quantized coefficients in accordance with context-adaptive binary arithmetic coding,
    wherein each of the rate-distortion optimized plurality of quantized coefficients is associated with a respective plurality of candidate coefficients,
    wherein a respective arc is associated with each of the plurality of candidate coefficients, the respective arc comprising at least three of context, cost, distortion cost, rate cost, state, or path parameters.

2. The encoder according to claim 1 wherein the processor is further configured to rate-distortion optimize the plurality of transform coefficients by employing dynamic programming.

3. The encoder of claim 2, wherein the processor is further configured to employ dynamic programming using a trellis configured in accordance with the HEVC state transition scheme.

4. The encoder of claim 1, wherein the transform comprises a discrete cosine transform.

5. The encoder of claim 1, wherein the processor is further configured to rate-distortion optimize the plurality of quantized coefficients using an inverse Lagrangian cost function.

6. A method, comprising:
    providing a residual indicative of a difference between a predicted video signal and a reconstructed video signal;
    performing a transform on the residual to provide a plurality of transform coefficients;
    rate-distortion optimizing the plurality of transform coefficients based on an HEVC state transition scheme to provide a plurality of rate-distortion optimized coefficients, wherein the rate-distortion optimizing further comprises:
        generating a plurality of candidates,
        generating a respective arc for each of the plurality of candidates, the respective arc comprising at least three of context, cost, distortion cost, rate cost, state, or path parameters, and
        determining which of the respective arcs has a lowest cost; and
    encoding the plurality of rate-distortion optimized coefficients in accordance with context-adaptive binary arithmetic coding to provide an encoded bitstream.

7. The method of claim 6, further comprising:
    performing a scan operation on the plurality of transform coefficients to provide a coefficient vector.

8. The method of claim 6, wherein rate-distortion optimizing the plurality of transform coefficients includes clamping the number of bits used to represent a distortion cost.

9. The method of claim 6, wherein encoding the plurality of rate-distortion optimized coefficients comprises encoding at a fixed rate.

10. The method of claim 6, further comprising generating a plurality of distortion costs based on an inverse Lagrangian cost function.

11. The method of claim 6, wherein generating the respective arc for each of the plurality of candidates comprises estimating a rate using an estimation table.

* * * * *